United States Patent [19]

Minaudo

[11] Patent Number: 5,186,953
[45] Date of Patent: Feb. 16, 1993

[54] CLOSING DEVICE FOR A TIRE CURING MOLD

[75] Inventor: Diego Minaudo, Rome, Italy

[73] Assignee: Bridgestone Corporation, Tokyo, Japan

[21] Appl. No.: 774,758

[22] Filed: Oct. 9, 1991

[30] Foreign Application Priority Data

Nov. 30, 1990 [IT] Italy ................. 67953 A/90

[51] Int. Cl.⁵ .............................. B29C 35/00
[52] U.S. Cl. ............................ 425/47; 425/54; 425/595
[58] Field of Search .............. 425/28.1, 47, 54, 595

[56] References Cited

U.S. PATENT DOCUMENTS

| | | | |
|---|---|---|---|
| 3,154,814 | 11/1964 | Fike | 425/47 X |
| 3,918,861 | 11/1975 | Klose | |
| 4,601,648 | 7/1986 | Amano et al. | |

FOREIGN PATENT DOCUMENTS

| | | |
|---|---|---|
| 57-140139 | 8/1982 | Japan . |
| 57-140142 | 8/1982 | Japan . |
| 58-102742 | 6/1983 | Japan . |
| 59-016733 | 1/1984 | Japan . |
| 2199531 | 7/1988 | United Kingdom . |

OTHER PUBLICATIONS

Patent Abstracts of Japan vol. 6, No. 242 (M-175) (1120) Nov. 30, 1982.
Patent Abstracts of Japan vol. 8, No. 104 (M-296) (1541) May 16, 1984.

Primary Examiner—Charles Hart
Attorney, Agent, or Firm—Ernst H. Ruf

[57] ABSTRACT

A closing device (9) (52) for axially connecting two half casings (7, 8) of a tire curing mold (1), the closing device (9) (52) featuring a number of calibrated hydraulic cylinders (19), each rigidly connected to a peripheral outer flange (12) on one of the half casings (7, 8), and having a rod (37) extending through a respective opening (41) (54) formed axially through a flange element (18) (53) on the other of the half casings (7, 8); each rod (37) having a head (42) (56) movable in relation to the flange element (18) (53) to and from a position of axial engagement with the flange element (18) (53) itself.

9 Claims, 4 Drawing Sheets

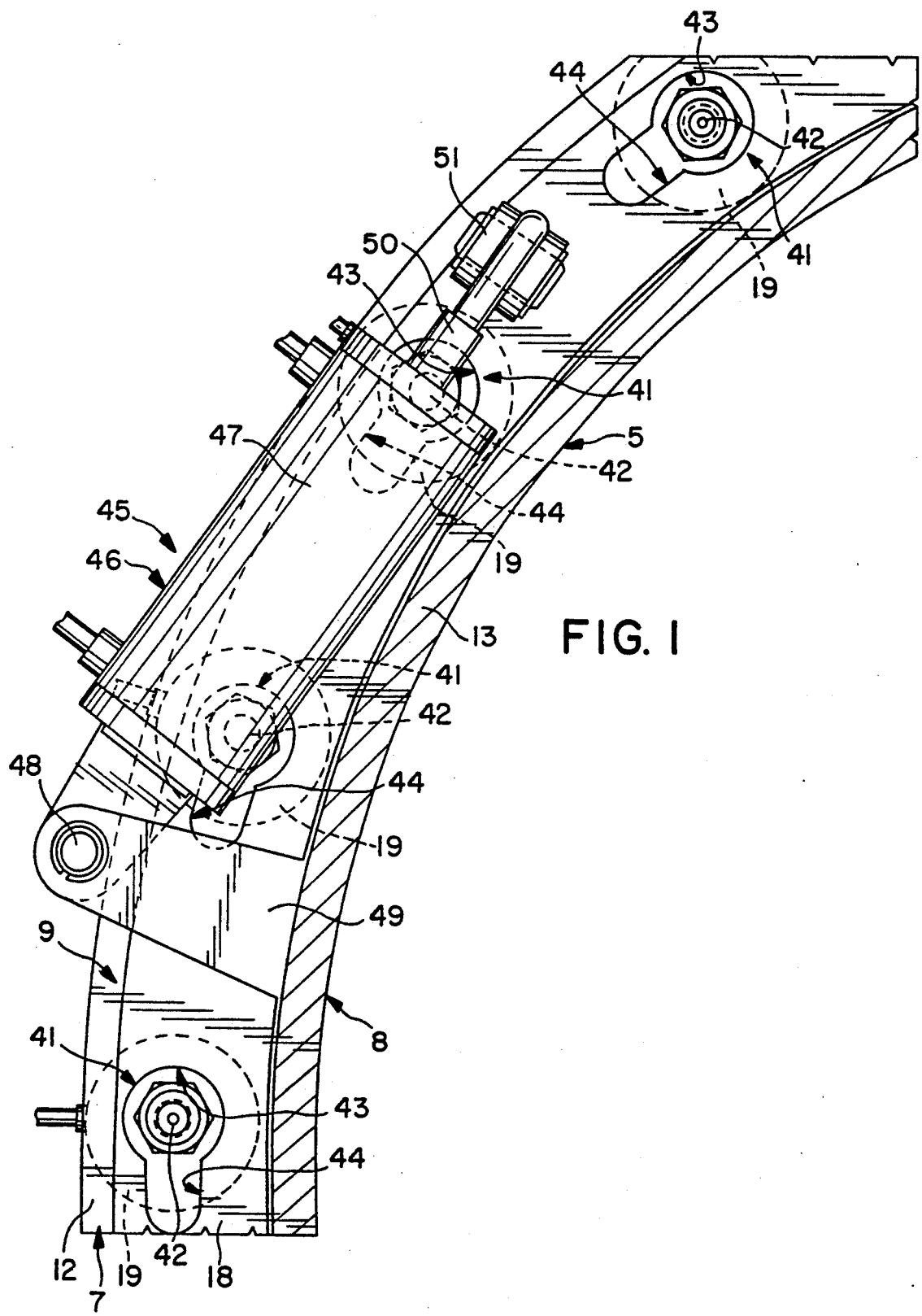

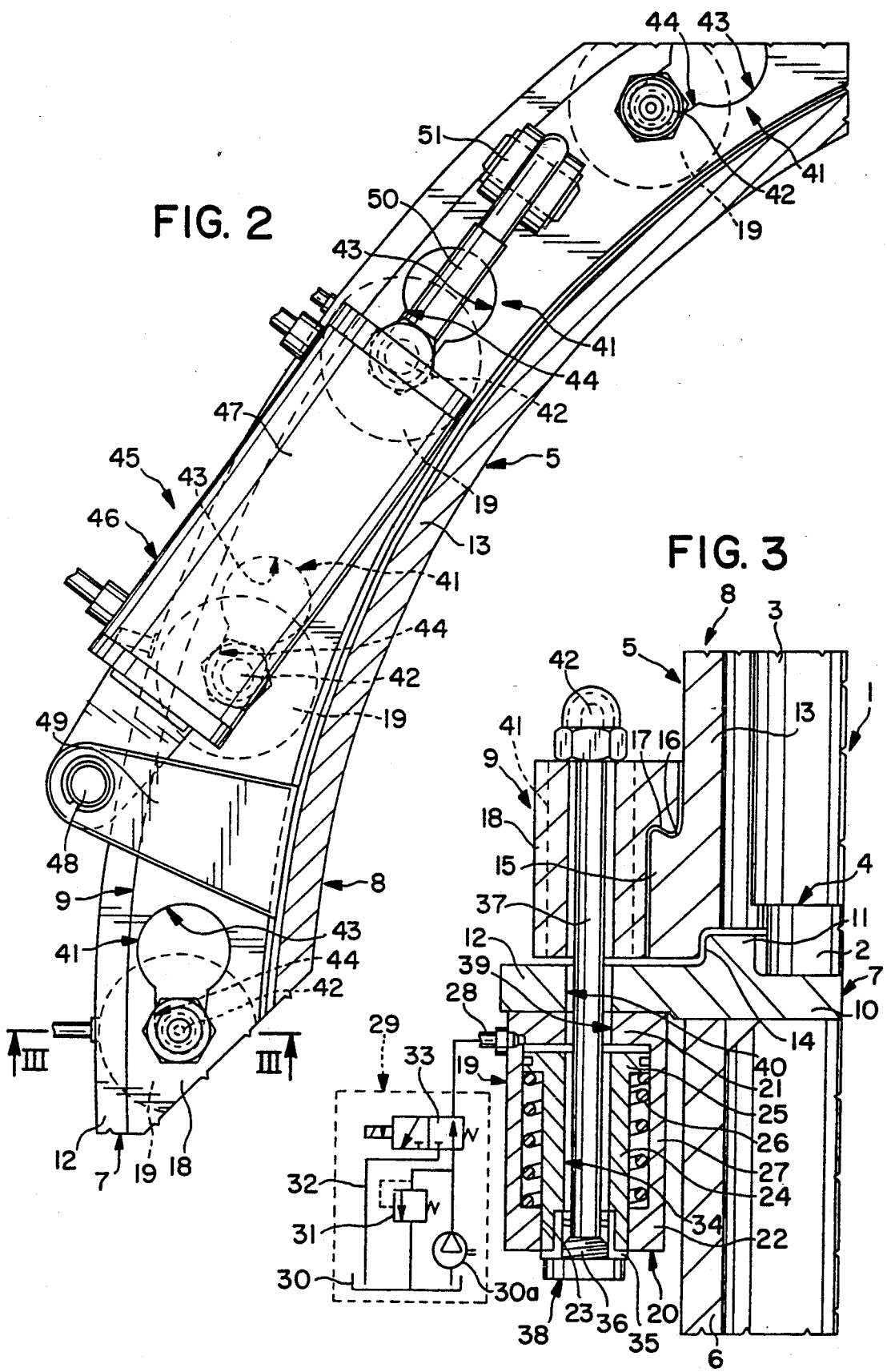

CLOSING DEVICE FOR A TIRE CURING MOLD

TECHNICAL FIELD

The present invention relates to a closing device for a tire curing mold.

BACKGROUND OF THE ART

Tire curing molds generally comprise two half molds, which are usually housed inside a casing in turn comprising two half casings. During the curing process, the two half molds are usually clamped together by keeping the casing closed, either by means of a press or an independent closing device on the casing itself, designed to axially and releasably connect the two half casings.

In the case of independent closing devices of the aforementioned type, the two halves of known curing mold casings are rigidly connected axially and in a releasable manner by means of a bayonet joint which, though highly effective from the functional standpoint, involves a number of drawbacks if, for any reason, the temperature inside the curing mold should accidentally get out of control and rise over and above a predetermined maximum temperature. In the event of this occurring, the rigid connection of the half casings may easily result in thermal stress, in turn resulting in failure of both the casing and the mold.

SUMMARY OF THE INVENTION

The aim of the present invention is to provide a curing mold closing device designed to overcome the aforementioned drawback. With this aim in view, according to the present invention, there is provided a closing device for a tire curing mold comprising two half molds housed inside a casing, which in turn comprises two half casings; said closing device including a peripheral outer flange on one of said half casings; a peripheral flange element on the other of said half casings and coaxial with and facing said flange; and releasable connecting means for axially connecting said flange and said flange element; characterized by the fact that said connecting means include a number of hydraulic cylinders connected integrally with said flange and each having a rod extending toward said flange element and having a flared head on an outer end thereof; a hydraulic circuit for supplying said hydraulic cylinders with hydraulic fluid at a given maximum pressure; a number of axial through openings formed through said flange element and each engaged in an axially sliding manner by a respective one of said rods and a respective one of said heads; and displacing means for moving each of said heads in relation to said flange element and to and from a position of axial engagement with same.

According to a first preferred embodiment of the noted closing device, said flange element is connected in a rotary manner to its respective half casing; each opening comprising a first portion enabling passage of a respective one of said heads, and a second smaller-section portion only enabling passage of a respective one of said rods; and said displacing means being located between said flange element and its respective said half casing, so as to move each of said rods in relation to said flange element and between a first position of engagement with said first portion of said opening, and a second position of engagement with said second portion of said opening.

According to a further preferred embodiment of the noted closing device, said flange element is integral with its respective half casing; each opening and each head presenting substantially the same elongated shape; and said displacing means being connected to said heads so as to turn same about the axis of a respective one of said rods, between a first position wherein the longitudinal axis of each of said heads is aligned with the longitudinal axis of a respective one of said openings, and a second position wherein the longitudinal axis of each of said heads forms an angle of other than zero, preferably a 90° angle, with the longitudinal axis of a respective one of said openings.

BRIEF DESCRIPTION OF THE DRAWINGS

A number of non-limiting embodiments of the present invention will be described by way of examples with reference to the accompanying drawings, in which:

FIGS. 1 and 2 show partial plan views of a first preferred embodiment of a closing device in accordance with the present invention in two distinct operating positions;

FIG. 3 shows a section along line III—III in FIG. 2;

Similar numerals refer to similar parts throughout the drawings.

BEST MODE FOR CARRYING OUT THE INVENTION

Figure 4:
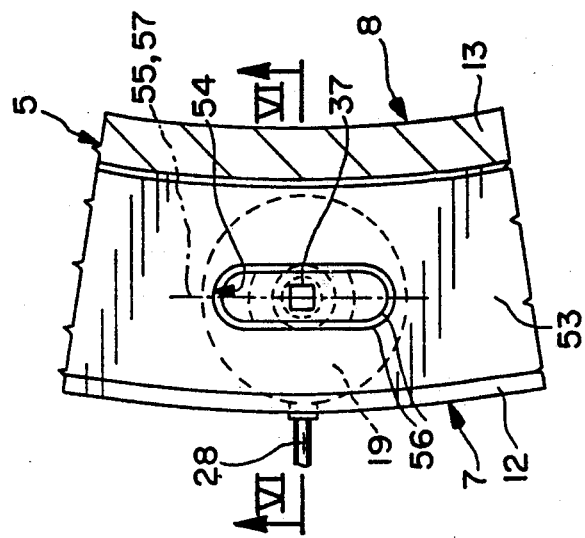
FIGS. 4 and 5 show partial plan views of a second preferred embodiment of a closing device in accordance with the present invention in two distinct operating positions.

Number 1 in FIG. 3 indicates a tire curing mold comprising a bottom half mold 2 and a top half mold 3 contacting each other along a plane 4 and housed inside a casing 5. Casing 5 comprises a base structure 6; a bottom half casing 7 connected integrally with the top end of structure 6; and a top half casing 8 supported on half casing 7 via mold 1 and connected to half casing 7 by means of a closing device indicated as a whole by 9. Half casing 7 substantially consists of a horizontal plate 10 having an upper annular rib 11 defining, on plate 10, an outer annular flange 12 forming part of closing device 9.

Half casing 8 is substantially cup-shaped, and comprises a lateral wall 13 open toward plate 10 and having an inner annular end groove 14 designed to receive rib 11 for centering half casing 8 on half casing 7. On the end facing flange 12, wall 13 presents an outer rim 15 defined at the top by an annular shoulder having an annular groove 16 engaged in transversely sliding manner by an annular tooth 17 of a flange element defined by a ring 18 forming part of closing device 9. Ring 18 is arranged facing and coaxial with flange 12, is supported axially on rim 15, and is connected in rotary manner to wall 13 by annular tooth 17 sliding transversely inside annular groove 16.

In addition to flange 12 and ring 18, closing device 9 also comprises a number of hydraulic cylinders 19 equally spaced about the periphery of casing 5 (FIGS. 1 and 2) and connected integrally with flange 12 (FIG. 3). As shown in FIG. 3, each cylinder 19 comprises a casing 20, one end wall 21 of which is connected integrally with the lower surface of flange 12, and the opposite end wall 22 of which includes an axial through hole 23 engaged in a sliding manner by the body 24 of a piston 25 mounted so as to slide in a fluid-tight manner inside casing 20 and toward wall 22 against the thrust exerted by a spring 26 compressed between piston 25 and wall 22. Close to wall 21, the lateral wall 27 of casing 20 houses the end of an output conduit 28 forming part of a hydraulic circuit 29 supplying pressurized fluid to cylinder 19 and over piston 25.

Circuit 29 comprises a tank 30; a delivery pump 30a connected at one end to tank 30 and at the other to conduit 28 via a calibrated valve 31 for draining fluid into tank 30 when the pressure inside circuit 29 exceeds a given value; and a drain conduit 32 connecting conduit 28 to tank 30 via valve 33. Piston 25 includes an axial through hole 34, the bottom end of which is fitted inside with an internally-threaded flanged coupling 35 connected adjustably to the threaded end portion 36 of a rod 37 extending along hole 34. Coupling 35 and threaded portion 36 combine to form a regulating device 38 for regulating the axial position or length of rod 37. Each rod 37 extends through a hole 39 in wall 21 and a hole 40 in flange 12 and, when half casings 7 and 8 are closed, engages a respective opening 41 formed through ring 18 and substantially coaxial with holes 39 and 40, and terminates, over ring 18, in a larger-diameter head 42.

As shown more clearly in FIGS. 1 and 2, when viewed from above, each opening 41 presents an elongated shape, along the circumference of ring 18, defined by a first circular portion 43 of at least the same diameter as head 42, and a second elongated portion 44 extending radially from portion 43 and at least as wide as the diameter of rod 37 but narrower than the diameter of head 42. As also shown in FIGS. 1 and 2, closing device 9 comprises an actuating device indicated as a whole by 45 and designed to turn or rotate ring 18 in relation to top half casing 8 and, consequently, bottom half casing 7. Actuating or displacing device 45 comprises a hydraulic actuator 46, the body 47 of which pivots at 48 on one end of a bracket 49 integral with wall 13, so as to turn in relation to half casing 8 about a vertical axis parallel to rods 37; and the output rod 50 of which is connected to a fork 51 extending upwardly from the upper surface of ring 18 and integrally with ring 18 itself.

In actual use, when half casings 7 and 8 are closed, actuating device 45 is so arranged as to maintain ring 18 in a first angular position (FIG. 1) in relation to half casing 8 and wherein rods 37 are coaxial with the first portion 43 of respective openings 41, and heads 42 are allowed to slide freely along respective openings 41 and out over ring 18. At this point, before supplying pressurized fluid to cylinders 19, actuating device 45 is operated so as to move ring 18 (clockwise in FIGS. 1 and 2) into a second position (FIG. 2) wherein rods 37 engage elongated portions 44 of respective openings 41. Consequently, when pressurized fluid is fed into cylinders 19 up to a given operating pressure, heads 42 press against ring 18 so as to lock half molds 2 and 3 together to a given pressure along plane 4.

To enable the above, a small amount of clearance must obviously be left between half casings 7 and 8 when half molds 2 and 3 are in contact along plane 4. As this clearance varies from one mold to another, it is advisable to adjust the total length of rods 37 to the type of mold 1 employed, using regulating device 38 prior to closing casing 5. In regard to adjusting device 38, it should be pointed out that, generally speaking, the length of rods 37 need only be adjusted on casings 5 for heavy-duty vehicle tire molds 1.

From the foregoing description, it will be clear that closing device 9 provides not only for trouble-free, automatic closure of curing mold 1, but also for maintaining the pressure inside mold 1 substantially constant. In fact, an increase in pressure inside mold 1 is accompanied immediately by an increase in pressure inside cylinders 19 and circuits 29, the calibrated valves 31 of which provide for automatically limiting the stress inside mold 1.

Figure 6:
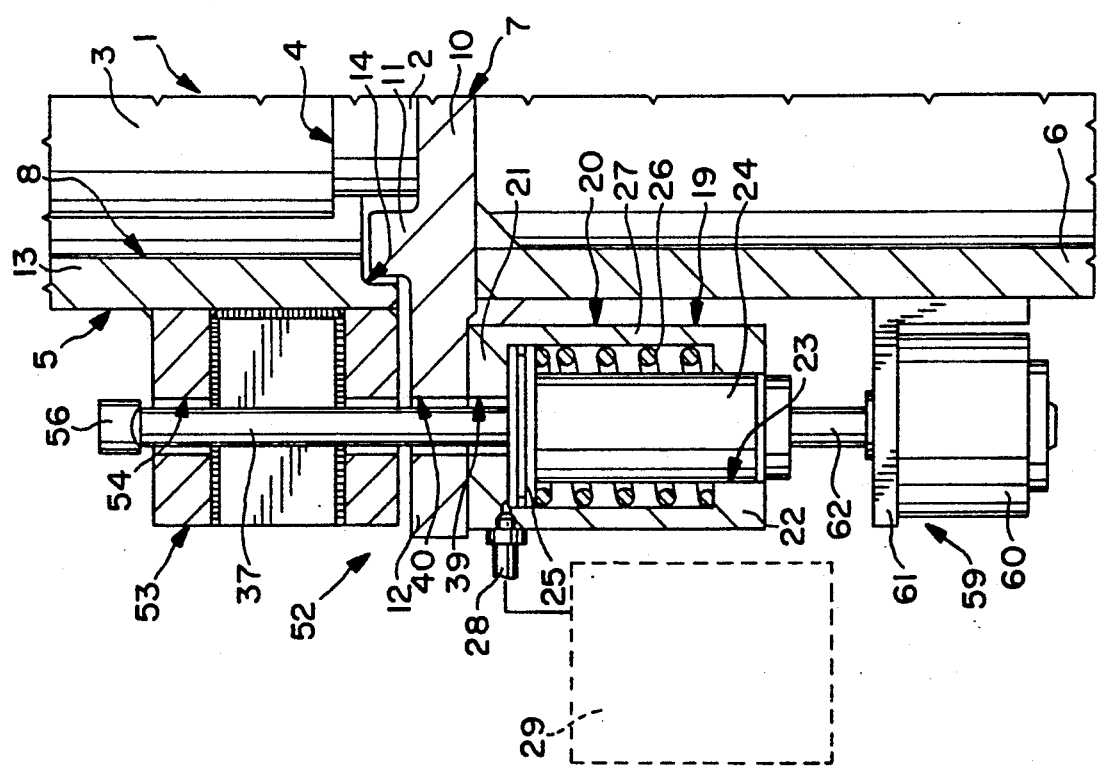
FIG. 6 shows a section along line VI—VI in FIG. 4.
Figure 5:
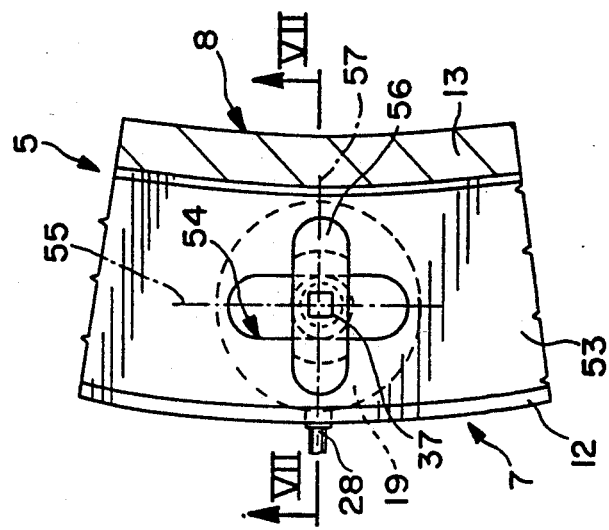
Figure 7:
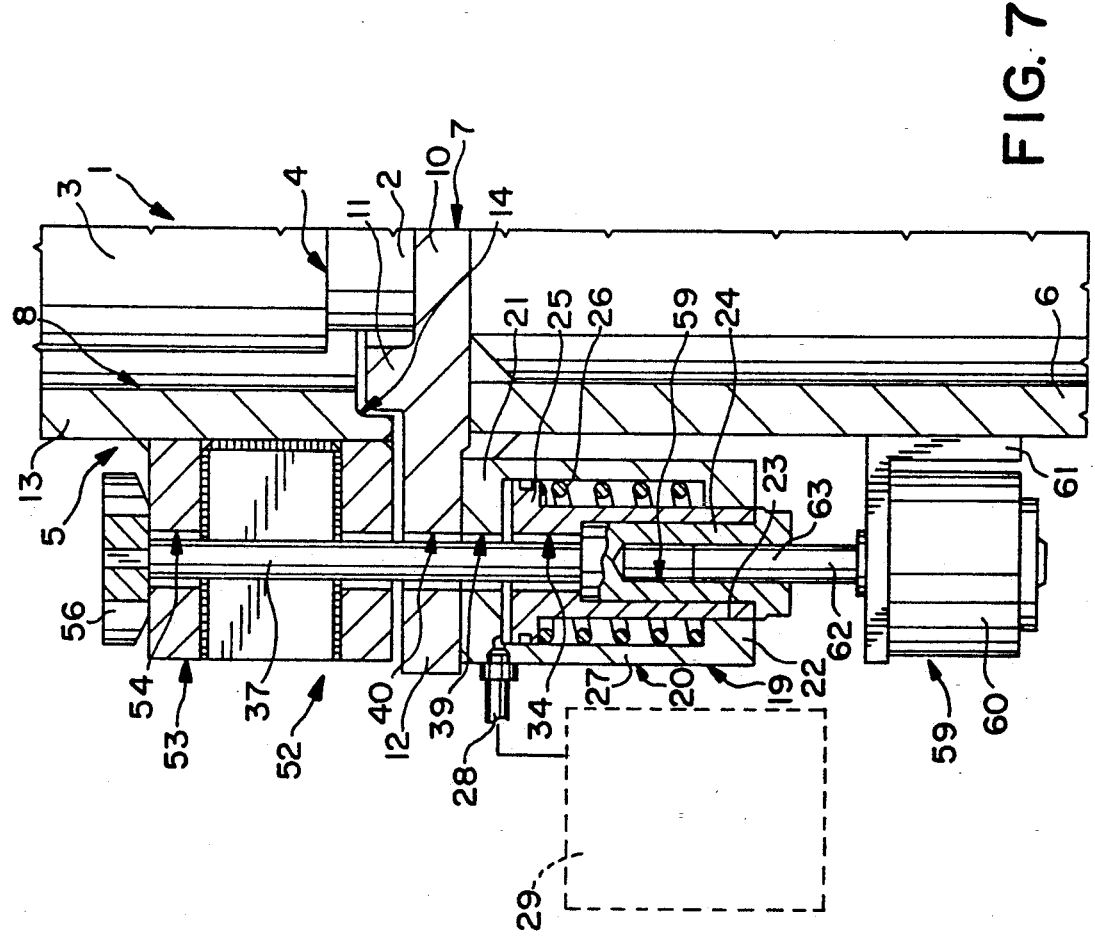
FIG. 7 shows a section along line VII—VII in FIG. 5.

FIGS. 4 to 7 relate to a closing device 52 which differs from device 9 by comprising, in place of ring 18, a flange element consisting of a double annular flange 53 coaxial with and facing flange 12 and integral with wall 13. Openings 41 on device 9 are replaced by openings 54 formed through flange 53 and each, when viewed from above (FIGS. 4 and 5), being of elongated shape arranged, in the example shown, with its longitudinal axis 55 extending along the circumference of flange 53. On device 52, heads 42 of device 9 are replaced by the same number of heads 56, each fitted on to the top end of a respective rod 37 and being, when viewed from above, of the same elongated shape, as a respective opening 54, with a longitudinal axis 57.

On device 52, adjusting device 38 is dispensed with, and each rod 37 is connected integrally with a respective piston 25, and presents, at the bottom end, an axial blind hold 58 connecting rod 37 to an actuating device 59 comprising a reversible motor 60 coaxial with rod 37 and connected integrally with structure 6 via a bracket 61. Motor 60 presents a rotary output shaft 62 engaging hole 58 and connected angularly to rod 37 via a splined joint 63, so as to turn rod 37 substantially 90 between a first position wherein axes 57 and 55 coincide, and a second position wherein axis 57 is perpendicular to axis 55.

In actual use, when half casings 7 and 8 are closed, rods 37 are arranged in said first position, so as to enable heads 56 to slide freely along and through respective openings 54 and out over flange 53. At this point, motors 60 are operated so as to move rods 37 and respective heads 56 into said second angular position prior to feeding pressurized fluid inside cylinders 19. In the examples shown, cylinders 19 are spring-return single-acting cylinders, but these may of course be replaced by double-acting cylinders (not shown).

From the foregoing description and operational discussions, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A closing device for a tire curing mold including two half molds housed inside a casing which in turn include two half casings; said closing device including a peripheral outer flange on one of said half casings; a peripheral flange element on the other one of said half casings and coaxial with and facing said flange; and releasable connecting means for axially connecting said flange and said flange element; characterized by the fact that said connecting means include a number of hydraulic cylinders connected integrally with said flange, each having a rod extending toward said flange element and having a flared head on an outer end thereof; a hydraulic circuit for supplying said hydraulic cylinders with hydraulic fluid at a given maximum pressure; a number of axial through openings formed through said flange element each engaged in an axially sliding manner by a respective one of said rods and a respective one of said heads; and displacing means for moving each of said heads in relation to said flange element and to and from a position of axial engagement with same.

2. A device as claimed in claim 1, characterized by the fact that said flange element is connected in a rotary manner to its respective half casing; and each of said opening includes a first portion enabling passage of a respective one of said heads, and a smaller-section second portion only enabling passage of a respective one of said rods; said displacing means being located between said flange element and its respective half casing, so as to move each of said rods in relation to said flange element and between a first position of engagement with said first portion of each of said openings and a second position of engagement with said second portion of each of said openings.

3. A device as claimed in claim 1, characterized by the fact that said flange element includes a ring fitted about and rotating in relation to its respective half casing; stop means being provided on said half casing, and engaging means on said flange element mating with said stop means for axially locking said flange element toward said other half casing.

4. A device as claimed in claim 2, characterized by the fact that said displacing means includes a linear actuator pivoting at one end on said flange element and at the other end on said respective half casing.

5. A device as claimed in claim 1, characterized by the fact that said flange element is integral with its respective half casing; each of said openings and said heads being substantially of the same elongated shape, and said displacing means being connected to said heads so as to turn each head about the axis of its respective rod and between a first position wherein the longitudinal axis of each head is aligned with the longitudinal axis of each of said openings, and a second position wherein the longitudinal axis of each of said heads forms an angle of other than zero with the longitudinal axis of each of said openings.

6. A device as claimed in claim 5, characterized by the fact that, when said head is in said second position, the longitudinal axis of each said heads forms an angle of about 90° with the longitudinal axis of each of said openings.

7. A device as claimed in claim 6, characterized by the fact that said flange element comprises a flange integral with its respective half casing.

8. A device as claimed in claim 7, characterized by the fact that, for each said rods, said displacing means includes actuating means integral with said casing and having a rotary output shaft connected in a sliding and axially-fixed manner to said rod for rotating same between said first and second positions.

9. A device as claimed in claim 8, characterized by the fact that said hydraulic circuit includes a calibrated drain valve.

* * * * *